(12) United States Patent
Wheeler et al.

(10) Patent No.: US 7,045,774 B2
(45) Date of Patent: May 16, 2006

(54) WIDE FIELD OF VIEW, FOUR-TELESCOPE, RADIAL SCANNING SEARCH AND ACQUISITION SENSOR

(75) Inventors: Bryce A. Wheeler, Mammoth Lakes, CA (US); Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 566 days.

(21) Appl. No.: 10/278,609

(22) Filed: Oct. 23, 2002

(65) Prior Publication Data
US 2005/0184228 A1    Aug. 25, 2005

(51) Int. Cl.
*G01J 1/00*    (2006.01)
*H04N 7/18*    (2006.01)

(52) U.S. Cl. .................. 250/236; 250/332; 348/168

(58) Field of Classification Search ........ 250/234–236, 250/332, 334; 348/162, 168, 203, 335
See application file for complete search history.

(56) References Cited

U.S. PATENT DOCUMENTS

| | | | |
|---|---|---|---|
| 2,858,453 A | 10/1958 | Harris | |
| 3,781,559 A * | 12/1973 | Cooper et al. | ............... 250/334 |
| 3,804,976 A | 4/1974 | Gard | |
| 5,264,930 A | 11/1993 | Florence et al. | |

* cited by examiner

*Primary Examiner*—Stephone B. Allen
(74) *Attorney, Agent, or Firm*—John E. Gunther; Leonard A. Alkov; Karl A. Vick (57) ABSTRACT

A wide field of view imaging system (100). The novel system (100) includes a rotating mirror (18) having two reflective surfaces each surface, respectively, reflecting light from a scene to first and second sensors (10, 12) positioned to receive light from the mirror (18), wherein the first and second sensors (10, 12) each occupy a different portion of the volume surrounding the mirror (18). In the illustrative embodiment, the mirror (18) is a flat, double-sided mirror rotating at a constant velocity about an axis parallel with the surface of the mirror (18). The first and second sensors (10, 12) are all-reflective optical systems, with the first sensor (10) opposite the second sensor (12). In the preferred embodiment, the invention further includes third and fourth opposing sensors (14, 16) clocked 90° from the first and second sensors (10, 12). The first and second sensors (10, 12) cover an outer annulus of the field of view while the mirror (18) rotates a first 90°, and the third and fourth sensors (14, 16) cover an inner annulus while the mirror (18) rotates the next 90°.

14 Claims, 7 Drawing Sheets

WIDE FIELD OF VIEW, FOUR-TELESCOPE, RADIAL SCANNING SEARCH AND ACQUISITION SENSOR

This invention was made with Government support under Sub-Contract No. P.O. 61772CD29S (TRW Space & Defense) under Prime Contract No. F04701-99-C-0047 awarded by the Department of the Air Force. Accordingly, the U.S. Government may have certain rights in this invention.

BACKGROUND OF THE INVENTION

1. Field of the Invention

The present invention relates to optical systems. More specifically, the present invention relates to wide field of view, radial scanning sensors.

2. Description of the Related Art

In certain imaging applications such as full earth surveillance from low altitude space platforms, missile launch warning from an airborne platform, or airborne threat detection from a ground base location, an extremely wide field of view (120° or more) optical system is required so that a very large two dimensional region of the object space may be covered and searched in a short period of time. Due to the large amount of spatial information to be collected while covering this large field of view, and due to the state of the art in detector array technology, particularly in the infrared portion of the spectrum, it is desirable in such imaging applications to utilize linear detector array technology. The use of a linear detector array dictates the need for some type of scanning technique and device, which allows the linear array to cover a two dimensional field of view. Further, it is desirable that this scanning technique and device be such that the detector assembly which includes the detector array, electronics and cryogenics, to be located on a stationary portion of the optical system. This latter desire is motivated by the difficulties associated with transferring electrical power and signals and cryogenic connections across a dynamic interface.

The prior art in this area is well represented by U.S. Pat. No. 5,347,391 entitled "Ultra Wide Field Of View Scanning Surveillance Optical System" by L. G. Cook and B. A. Wheeler, which describes a full-field refractive optical system that employs a rotating Pechan prism, with five internal reflections, as a scanning device. While useful, this prior art has several limitations. First, the entire field of view is covered in a single refractive optical system which is stressed to its limits and offers little growth in aperture or field of view. Second, the refractive nature of the telescope containing the scanning Pechan prism makes the coverage of a broad spectral band difficult. Third, the required amount and quality of the silicon material needed to construct the Pechan prism is a cost concern. Also, the effect of imperfections in the construction and alignment of the Pechan prism can significantly impact the sensor line-of-sight, transmission efficiency and image quality as the Pechan is rotated. Finally, the nonrelayed nature of the refractive telescope makes even partial cold shielding (when needed) difficult.

Hence, a need exists in the art for an improved optical system which provides a requisite wide field of view, allows broad spectral coverage and cold shielding, does not require a Pechan prism, and which locates the detector array, cryogenics, and electronics off of the scanning part of the sensor.

SUMMARY OF THE INVENTION

The need in the art is addressed by the wide field of view imaging system of the present invention. The novel system includes a rotating mirror having two reflective surfaces that simultaneously reflect light from a scene to first and second sensors positioned to receive light from the mirror, wherein the first and second sensors each occupy a different portion of the volume surrounding the mirror. In the illustrative embodiment, the mirror is a flat, double-sided mirror rotating at a constant velocity about an axis parallel with the surface of the mirror. The first and second sensors are all-reflective optical systems, with the first sensor opposite the second sensor. In the preferred embodiment, the invention further includes third and fourth opposing sensors clocked 90° from the first and second sensors. The first and second sensors cover an outer annulus of the field of view while the mirror rotates a first 90°, and the third and fourth sensors cover an inner annulus while the mirror rotates the next 90°. The complete field is scanned by a mirror rotation of 180 degrees.

BRIEF DESCRIPTION OF THE DRAWINGS

FIGS. 5a and 5b show an example optical system which can be used as a sensor for the present invention. FIG. 5a shows a side view, and FIG. 5b shows a top view.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention replaces the refractive telescope containing an internal Pechan prism scan mechanism of the prior art with a two-sided rotating flat mirror out in front of four reflective telescopes that provide the field coverage. A fundamental characteristic of a rotating optical system is that every degree of rotation of the mirror rotates the scene two degrees. Thus, a mirror which scans 180° gets full 360° coverage. The only drawback is that for a certain size aperture, the mirror needs to get larger to scan a wider angle. In order to scan 180°, the mirror would need to be of infinite size (since the surface would be in line with the optics at 180°). Therefore, a single mirror derotator with one optical system cannot achieve full coverage.

The solution presented by this invention uses two opposing optical systems with two mirrors or, in the preferred embodiment, a single double-sided mirror. With this system, a mirror rotation of 90° will result in a full 360° scan, 180° by each optical system. At a 90° rotation, the mirror size needs to √2 larger than the aperture of the optical system. Thus, a 3 inch mirror can scan 90° for a sensor with a 2 inch aperture.

Figure 1A:
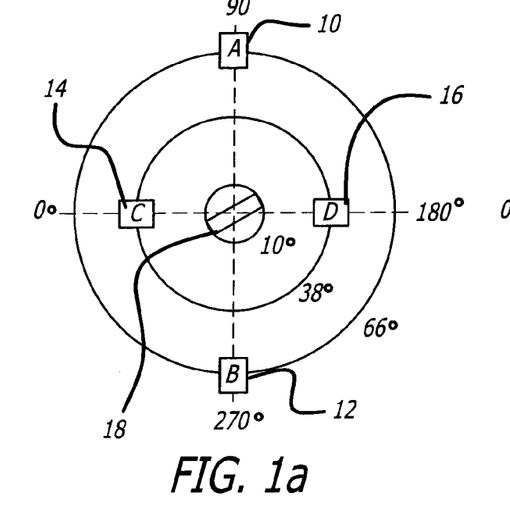
FIG. 1a is an illustration showing the location of the four sensors in accordance with the teachings of the present invention.

The system described above with two opposing sensors and a single double-sided mirror with 90° rotation has a data stream which is at a 50% scan efficiency due to 50% dead time. The system can be made more efficient by adding two additional sensors located 90° from the original two sensors. FIG. 1a is an illustration showing the location of the four sensors in accordance with the teachings of the present invention. Two opposing sensors, sensor A 10 and sensor B 12, are located: at 90° and 270°, respectively. A second set of opposing sensors, sensor C 14 and sensor D 16, are located at 0° and 180°, respectively. A double-sided mirror 18 is located at the nadir.

Figure 1B:
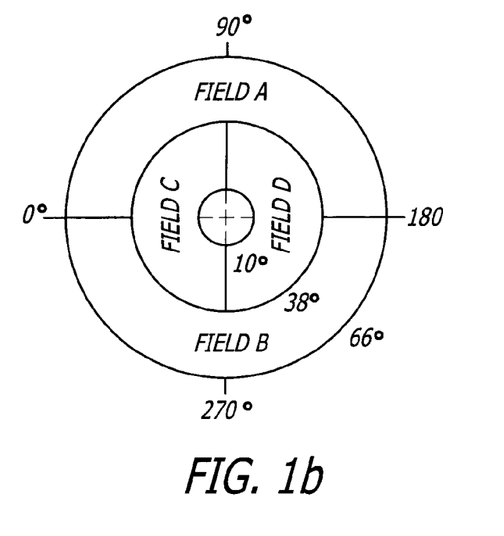
FIG. 1b is an illustration showing the regions covered by each sensor in accordance with the teachings of the present invention.

The desired half-angle field of view of 56° can be broken into two 28° scan fields, partitioning the field of view into inner and outer annular rings. One set of opposing sensors scans the inner annulus and the second set of sensors scans the outer annulus. FIG. 1b is an illustration showing the regions covered by each sensor. In the example, the inner ring is from 10° to 38°, and the outer ring is from 38° to 66°. Sensors A and B scan the outer annular ring and sensors C and D scan the inner annulus. Sensor A covers the field from 0° to 180°, and sensor B covers the field from 180° to 360°. Sensor C covers the field from −90° to 90°, and sensor D covers the field from 90° to 270°.

Because the second set of sensors is clocked 90° apart from the first set, the same double-sided mirror can be used during the dead time of the first set of sensors to scan the second set of sensors. The second set of sensors has a 50% duty cycle which is out of phase by 90° to the first set, resulting in a data stream with 100% efficiency. This is illustrated in FIG. 2.

Figure 2:
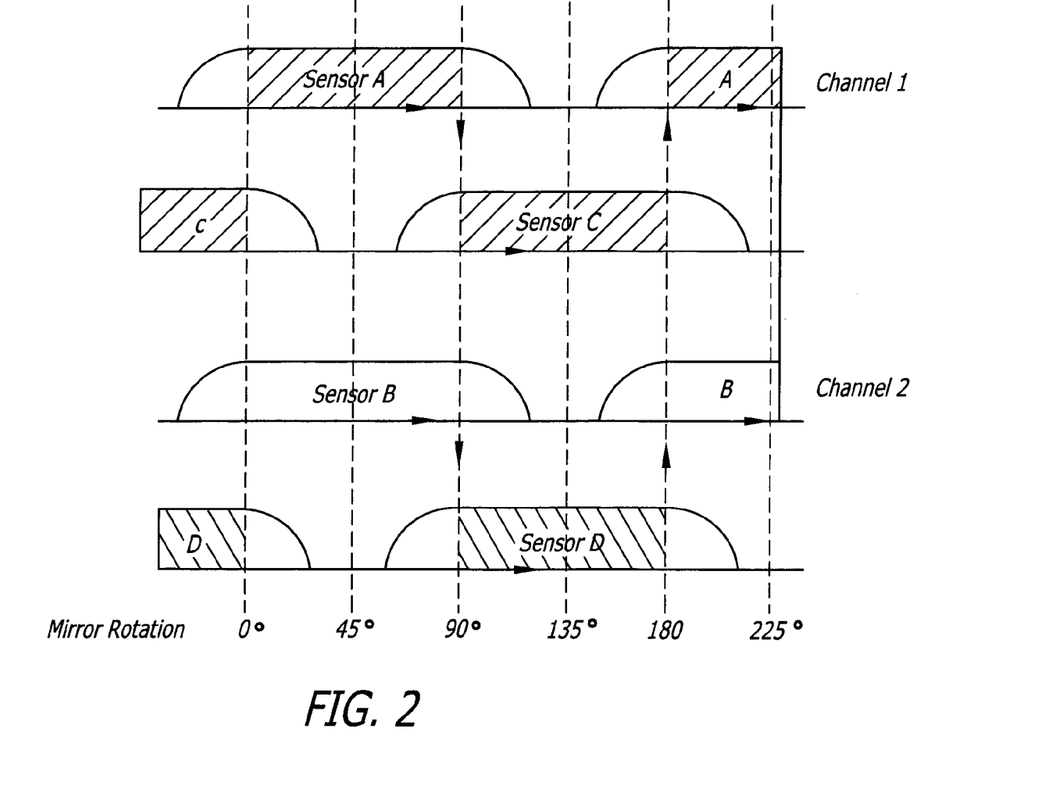
FIG. 2 is an illustration showing the continuous data stream, consisting of two channels, from the four sensors in accordance with the teachings of the present invention.

FIG. 2 is an illustration showing the continuous data stream from the four sensors. The data from the four sensors is output in two channels. The first channel transmits data from sensors A and C, while the second channel transmits data from sensors B and D. While the mirror 18 rotates from 0° to 90°, sensors A and B are scanning, so channel 1 transmits data from sensor A and channel 2 transmits data from sensor B. While the mirror 18 rotates from 90° to 180°, sensors C and D are scanning; When the mirror 18 is at 90°, channel 1 switches from sensor A to sensor C, and channel 2 switches from sensor B to sensor D. When the mirror 18 is at 180°, channel 1 switches back to sensor A, and channel 2 switches back to sensor B. From 180° to 360° mirror rotation, the cycle repeats.

Figure 3A:
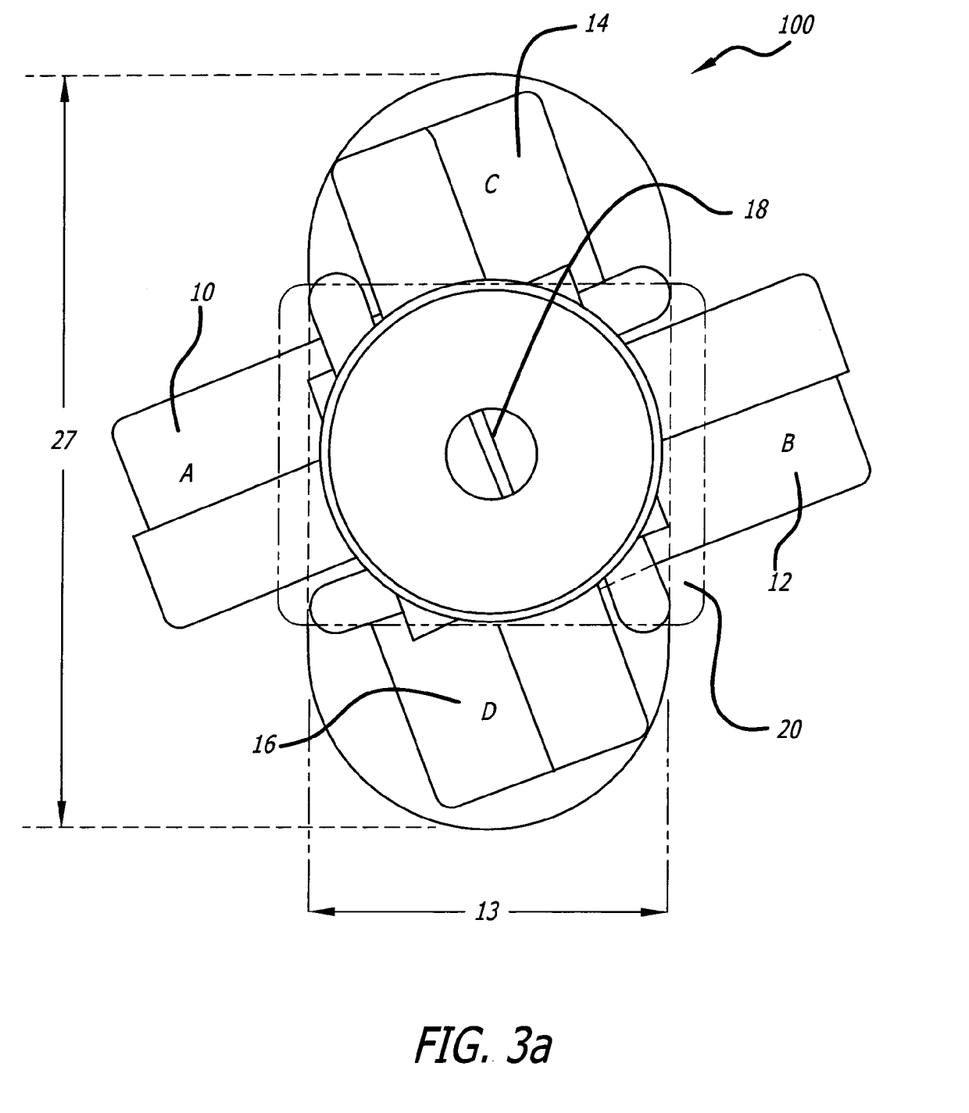
FIG. 3a is an illustration showing a bottom view of an illustrative embodiment of the present invention.
Figure 3B:
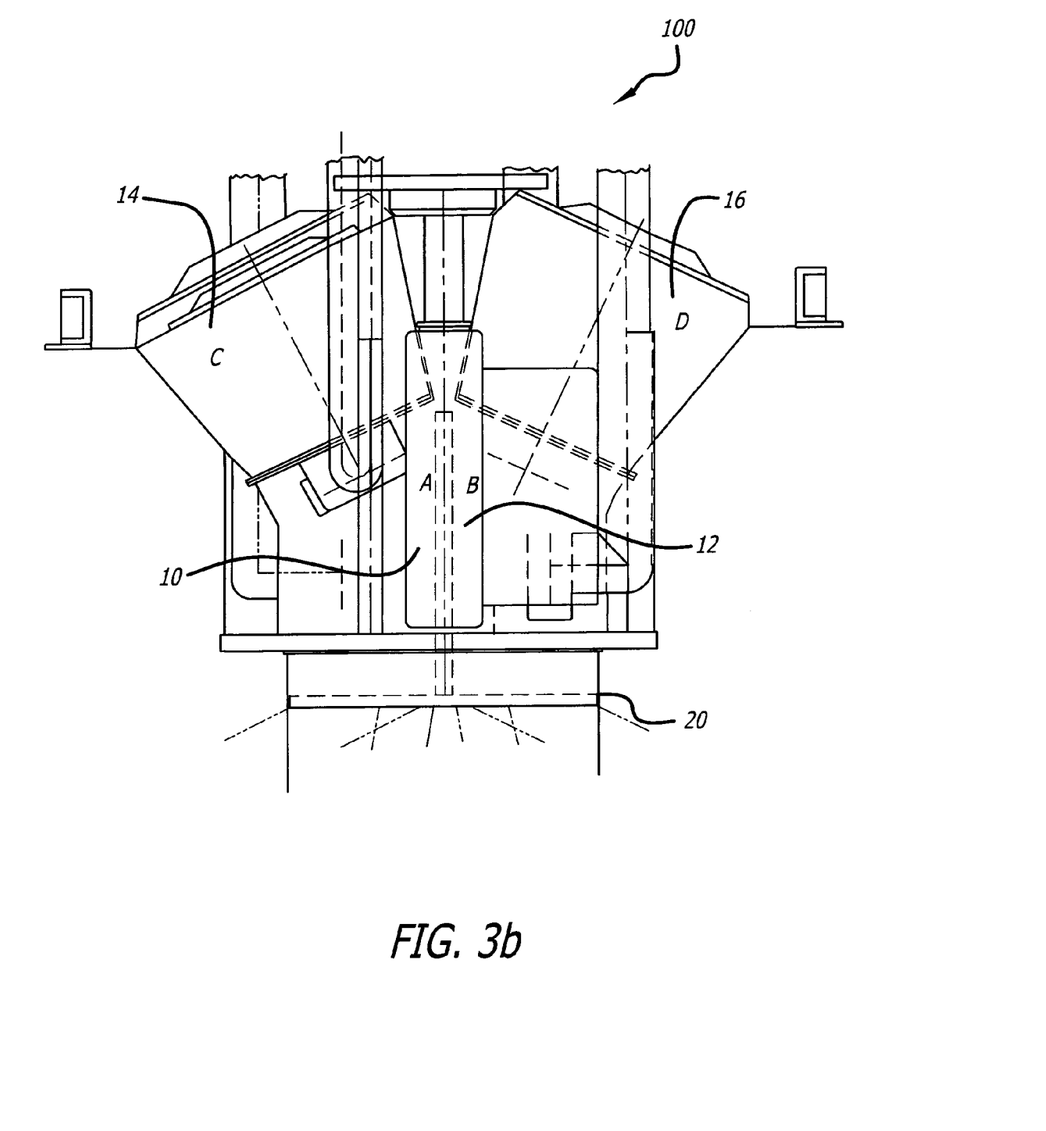
FIG. 3b is an illustration showing a side view of an illustrative embodiment of the present invention.
Figure 3C:
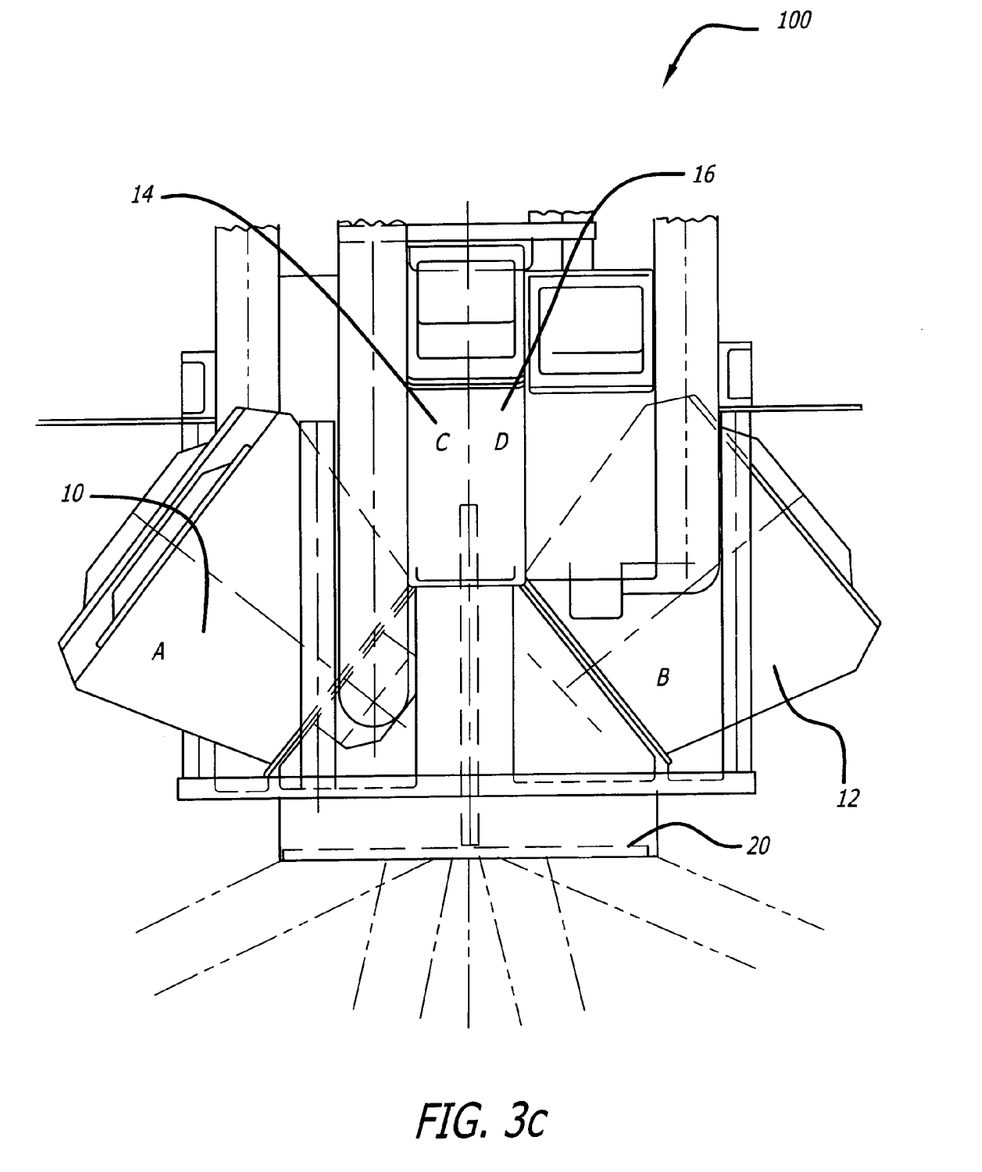
FIG. 3c is an illustration showing a side view of an illustrative embodiment of the present invention oriented 90° from FIG. 3b.

FIGS. 3a–3c are illustrations of an illustrative embodiment of the present invention. FIG. 3a shows a bottom view of the sensor unit 100. A double-sided rotating flat mirror 18 is located at the center of the sensor at the nadir in front of four reflective telescopes (10, 12, 14, 16) that provide the field coverage. The mirror 18 is rotating at a constant velocity about an axis parallel with the surface of the mirror. Light from a scene to be imaged enters the system through a window 20. The window 20 may include a filter to prevent glare from the sun and other unwanted radiation from entering the optical cavity common to the four telescopes. The light is reflected off the mirror 18 to four sensors A 10, B 12, C 14, and D 16. Sensor A 10 is located opposite sensor B 12, and sensor C 14 is opposite sensor D 16. Sensors A 10 and B 12 are clocked 90° from sensors C 14 and D 16. The sensors are located such that they do not interfere with the rotating mirror 18. Each reflective sensor occupies a quadrant of the volume surrounding the scan mirror 18 and each provides a wide line field of view that is sequentially scanned over the field by the mirror 18. Sensors A 10 and B 12 cover an outer annulus of the field while the scan mirror 18 rotates 90°, then sensors C 14 and D 16 cover an inner annulus while the scan mirror 18 rotates the next 90°. As explained above, when the mirror 18 has completed a full rotation, two scans of the entire scene have been completed.

FIG. 3b shows a side view of the sensor unit 100. Sensors C 14 and D 16 are shown, and sensors A 10 and B 12 are in and out of the paper. FIG. 3c shows a side view of the sensor unit 100 flipped 90° from that of FIG. 3b. Sensors A 10 and B 12 are shown, and sensors C 14 and D 16 are in and out of the paper.

Figure 4:
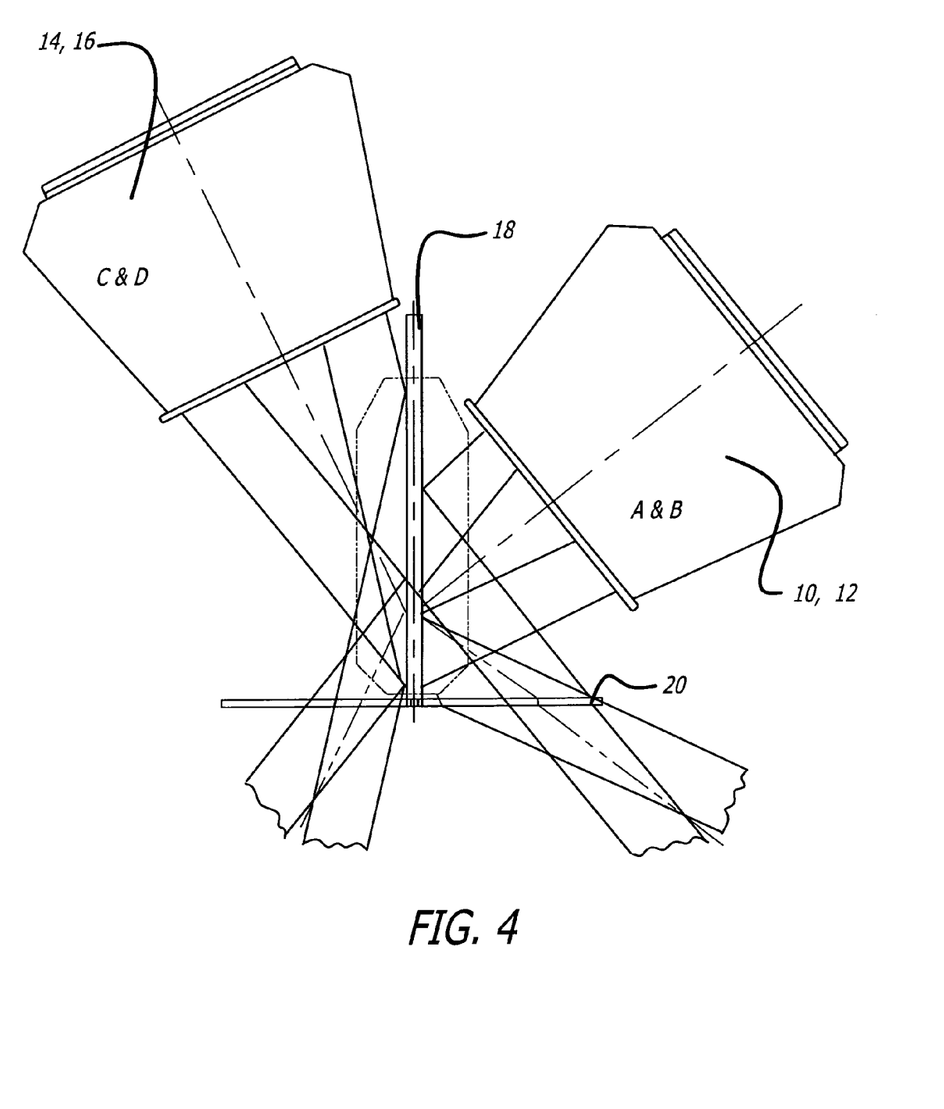
FIG. 4 is a diagram showing the location of the sensors relative to the scan mirror and the window.

FIG. 4 is a diagram showing the location of the sensors relative to the scan mirror 18 and the window 20. Sensors A 10 and B 12 are aimed to scan the outer annulus of the field of view, and sensors C 14 and D 16 are aimed to scan the inner annular ring of the field of view.

While the mirror 18 shown in FIG. 4 is illustrated as two parallel mirror surfaces located on opposite sides of a structural member, or substrate, it should be understood that the invention is not limited thereto. Any suitable mirror may be used. Some applications, for instance, might benefit by having a single mirror, reflective on both sides, supported by one or two refractive substrates.

In the illustrative embodiment described, there will be a dead zone along the nadir which will not be imaged by any of the sensors. This can be viewed by adding a staring focal plane array with no moving parts point straight down along the nadir.

Figure 5A:
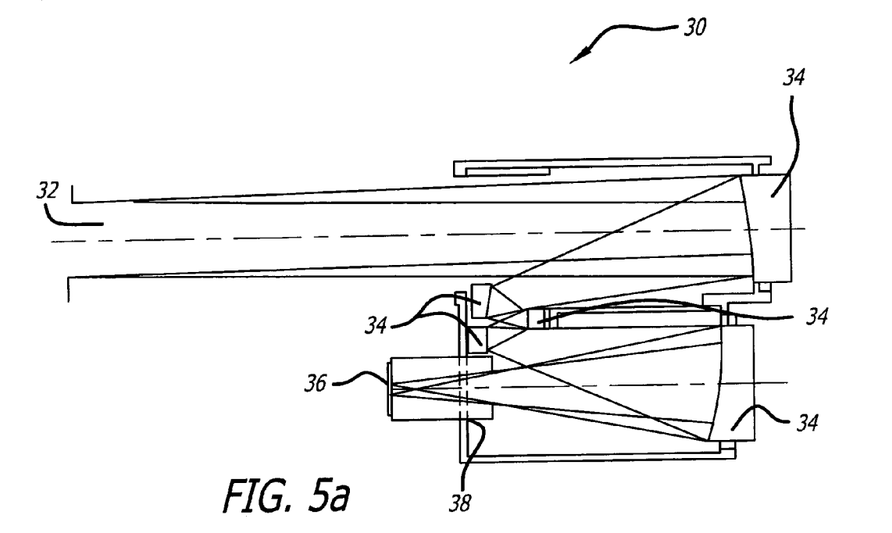
Figure 5B:
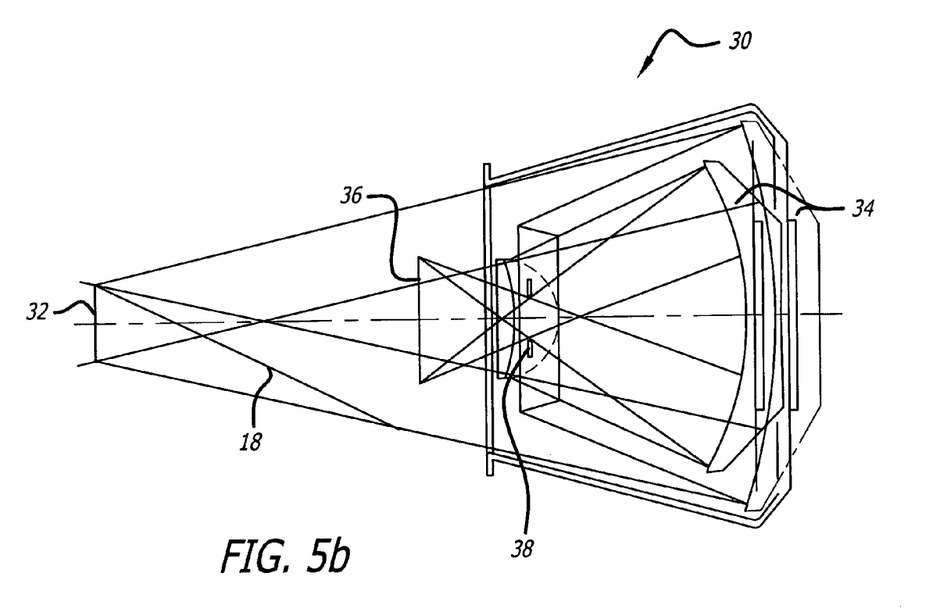

The sensors A 10, B 12, C 14, and D 16 can be any reflective optical system designed to receive radiation of the desired wavelengths. FIGS. 5a and 5b show an example all-reflective optical system 30 which can be used as a sensor for the present invention. FIG. 5a shows a side view, and FIG. 5b shows a top view. This example system is a classic re-imaging system of conventional design and construction, designed for a particular packaging layout. Light enters through an entrance pupil 32, passes through a number of mirrors 34, and focuses on a detector 36. The system 30 may also include a cold stop 38 placed at an exit pupil to shield the detector from all radiation other than what comes in from the aperture (entrance pupil) 32.

Figure 6:
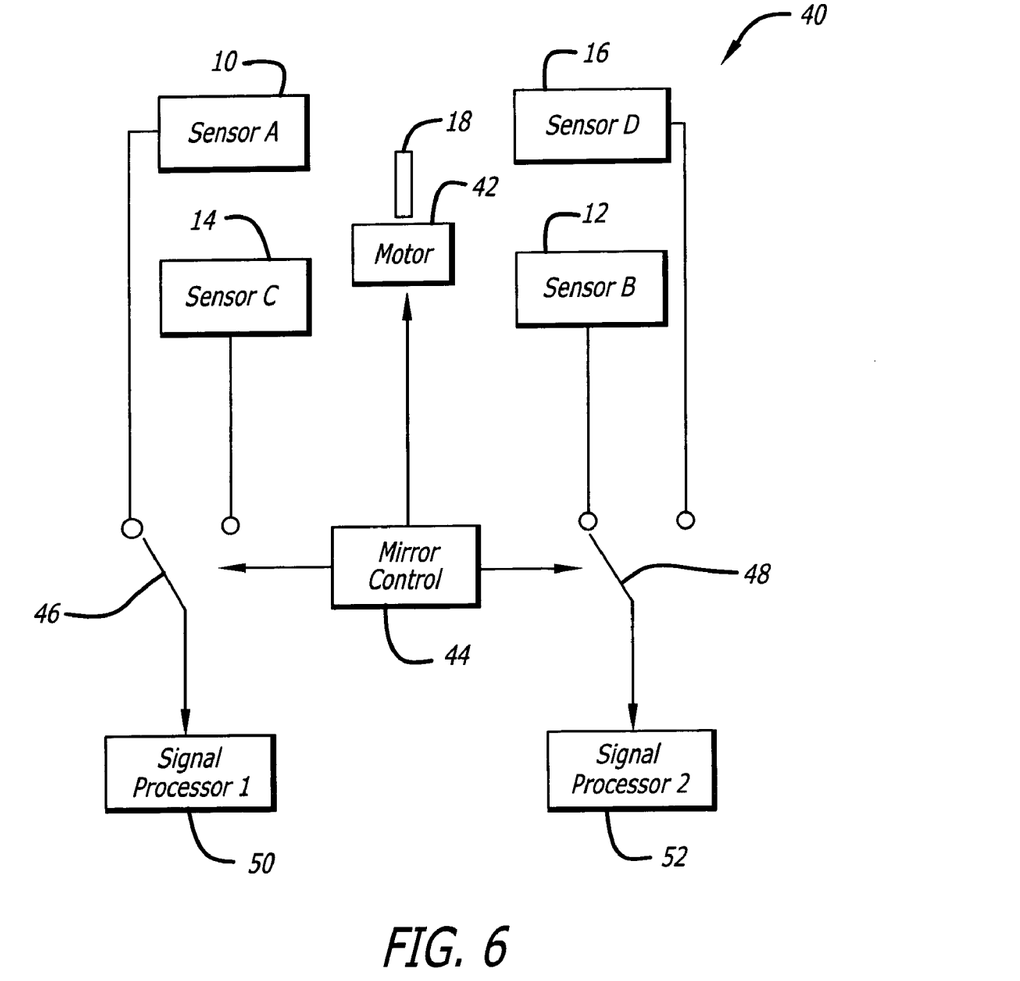
FIG. 6 is a block diagram of an overall system of the present invention.

FIG. 6 is a block diagram of an overall system 40 of the present invention. A motor 42 rotates a double-sided mirror 18 located in front of four sensors 10, 12, 14, and 16. The motor 42 is controlled by a mirror control system 44. The mirror control system 44 also controls two switches 46 and 48. The first switch 46 directs data from sensors A 10 and C 14 to a first signal processor 50, and the second switch 48 directs data from sensors B 12 and D 16 to a second signal processor 52. While the mirror 18 rotates from 0° to 90°, sensors A 10 and B 12 are scanning, so the switches 46 and 48 connect sensors A 10 and B 12 to their respective processors. While the mirror 18 rotates from 90° to 180°, sensors C 14 and D 16 are scanning. When the mirror 18 is at 90°, the mirror control 44 directs switch 46 to sensor C 14, and switch 48 to sensor D 16. When the mirror 18 is at 180°, the mirror control 44 directs switch 46 back to sensor A 10, and switch 48 to sensor B 12. From 180° to 360°, the cycle repeats.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A wide field of view imaging system comprising:
   a rotating mirror for reflecting light from a scene and
   first, second, third and fourth sensors positioned to receive light from said mirror, wherein said sensors each occupy a different portion of the volume surrounding said mirror, said first sensor being located opposite said second sensor and said third sensor being located opposite said fourth sensor, said first and second sensors being clocked 90° from said first and second sensors and wherein said first and second sensors cover an outer annulus of the field of view and the third and fourth sensors cover an inner annulus.

2. The invention of claim 1 wherein said mirror is double-sided.

3. The invention of claim 1 wherein said mirror is flat.

4. The invention of claim 1 wherein said mirror is rotating about an axis parallel with the surface of the mirror.

5. The invention of claim 1 wherein said mirror is rotating at a constant velocity.

6. The invention of claim 1 wherein said sensors are all-reflective.

7. The invention of claim 1 wherein said each sensor occupies a quadrant of the volume surrounding said mirror.

8. The invention of claim 1 wherein said first and second sensors scan while the mirror rotates a first 90° and said third and fourth sensors scan while the mirror rotates the next 90°.

9. A wide field of view imaging system comprising
   a rotating double-sided mirror for reflecting light from a scene,
   first and second sensors positioned to receive light from an outer annulus of the field of view from said mirror while the mirror rotates a first 90°; and
   third and fourth sensors positioned to receive light from an inner annulus of the field of view from said mirror while the mirror rotates the next 90°, wherein said first, second, third, and fourth sensors each occupy a quadrant of a volume surrounding said mirror.

10. A method for imaging a wide field of view including the steps of:
    reflecting light from a scene using a rotating mirror; and
    receiving said light using two opposing sensors, each sensor occupying a different portion of the volume surrounding said mirror, each of said sensors covering an annulus of the field of view.

11. A wide field of view imaging-system comprising:
    a double-sided mirror for reflecting light from a scene;
    means for rotating said mirror; and
    first and second sensors positioned to receive light from an outer annulus of the field of view from said mirror while the mirror rotates a first 90°.

12. A wide field of view imaging system comprising:
    a mirror for reflecting light from a scene;
    means for rotating said mirror; and
    first, second, third and fourth sensors positioned to receive light from said mirror, wherein said sensors each occupy a different portion of the volume surrounding said mirror, said first and second sensors covering an outer annulus of the field of view and the third and fourth sensors covering an inner annulus.

13. A wide field of view imaging method including the steps of:
    rotating double-sided mirror to reflect light from a scene and
    positioning first and second sensors to receive light from an outer annulus of the field of view from said mirror while the mirror rotates a first 90°.

14. A wide field of view imaging method including the steps of:
    rotating a mirror to reflect light from a scene and
    positioning first, second, third and fourth sensors to receive light from said mirror, wherein said sensors each occupy a different portion of the volume surrounding said mirror, said first and second sensors covering an outer annulus of the field of view and the third and fourth sensors covering an inner annulus.

* * * * *